United States Patent
Tomioka et al.

(10) Patent No.: US 12,338,368 B2
(45) Date of Patent: Jun. 24, 2025

(54) FERRULE POLISHING MATERIAL

(71) Applicant: ADMATECHS CO., LTD., Miyoshi (JP)

(72) Inventors: Yusuke Tomioka, Miyoshi (JP); Tempo Nakamura, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 18/380,228

(22) Filed: Oct. 16, 2023

(65) Prior Publication Data

US 2024/0034908 A1 Feb. 1, 2024

Related U.S. Application Data

(63) Continuation of application No. PCT/JP2022/016792, filed on Mar. 31, 2022.

(51) Int. Cl.
*C09G 1/02* (2006.01)

(52) U.S. Cl.
CPC .................................... *C09G 1/02* (2013.01)

(58) Field of Classification Search
CPC .................................. C09G 1/02; C09K 3/14
See application file for complete search history.

(56) References Cited

U.S. PATENT DOCUMENTS

| | | | |
|---|---|---|---|
| 10,451,816 B2 | 10/2019 | Igawa | |
| 2002/0118927 A1* | 8/2002 | Takada | G02B 6/3833 264/1.25 |
| 2004/0005460 A1* | 1/2004 | Yamazaki | B24B 19/226 428/404 |
| 2018/0341068 A1 | 11/2018 | Igawa | |
| 2020/0413542 A1 | 12/2020 | Ooyama | |
| 2021/0261823 A1 | 8/2021 | Tomioka | |

FOREIGN PATENT DOCUMENTS

| | | | |
|---|---|---|---|
| JP | 2007190613 A | | 8/2007 |
| JP | 2008001803 A | * | 1/2008 |
| WO | WO-2017098579 A1 | | 6/2017 |
| WO | WO-2020100848 A1 | | 5/2020 |

OTHER PUBLICATIONS

International Search Report issued May 17, 2022 in PCT/JP2022/016792 (with English translation), 5 pages.
Written Opinion issued May 17, 2022 in PCT/JP2022/016792 (with English machine translation), 9 pages.
"4,4'-Methylenediphenol _ C13H12O2 _ CID 12111—PubChem", retrieved from https://pubchem.ncbi.nlm.nih.gov/compound/12111.
"Biphenyl _ C6H5C6H5 _ CID 7095—PubChem" , retrieved from https://pubchem.ncbi.nlm.nih.gov/compound/Biphenyl.
"Bisphenol A _ C15H16O2 _ CID 6623—PubChem" retrieved from https://pubchem.ncbi.nlm.nih.gov/compound/6623.

* cited by examiner

*Primary Examiner* — Alexandra M Moore
(74) *Attorney, Agent, or Firm* — Element IP, PLC

(57) ABSTRACT

Provided is a ferrule polishing material suitable for polishing a ferrule. A ferrule polishing material of the present invention solving the above object includes a binder formed from a resin material and abrasive grains dispersed in the binder. The resin material is formed from an epoxy resin. The abrasive grains are contained in an amount of not less than 80% and not greater than 91% with respect to the sum of masses of the abrasive grains and the binder, include small-diameter particles being particles having a particle diameter of not greater than 100 nm, the small-diameter particles being present in an amount of not less than 62.5% and not greater than 80% with respect to the mass of the abrasive grains, and are formed from silica.

10 Claims, No Drawings

FERRULE POLISHING MATERIAL

TECHNICAL FIELD

The present invention relates to a ferrule polishing material to be used in polishing an end face of a ferrule.

BACKGROUND ART

In recent years, in association with demands for larger capacities and higher efficiencies, optical fibers used as transmission means for optical communication are required to have as little optical loss as possible. For connection of an optical fiber and another optical fiber, an optical connector is used. The optical connector has a ferrule. The ferrule has formed therein an insertion hole into which an optical fiber is inserted. The optical fiber is fixed to the ferrule with an adhesive or the like.

The quality of the connection end face of the optical connector influences optical characteristics of the optical fiber and thus is very important. Therefore, the optical connector end face is subjected to mirror-processing through a plurality of stages of polishing. As final finishing of the polishing, precision mirror polishing using a polishing material, such as a polishing sheet, a polishing tape, a polishing grinding stone, or a polishing cloth, including a polishing layer containing fine abrasive grains, is performed (Patent Literature 1).

Citation List

Patent Literature

Patent Literature 1: JP2008001803 (A)

SUMMARY OF INVENTION

Technical Problem

Meanwhile, in order to realize large capacities of optical fibers, a multi-core optical fiber composed of a plurality of optical fibers has been developed. For connection of the multi-core optical fiber, a multi-core ferrule is used, and the end face thereof is required to be mirror-finished with still higher precision.

Even in the case of a single-core optical fiber, in order to improve workability, a plurality of ferrules may be simultaneously polished, and precision mirror finish is required as in the case of the multi-core ferrule.

In order to perform precision mirror finish, high durability of the polishing material and less degradation due to use are desired. Further, less degradation of the polishing material allows the polishing material to be continuously usable, leading to improved workability.

The present invention has been completed in consideration of the above circumstances. A problem addressed by the present invention is to provide a high performance ferrule polishing material suitable for polishing a ferrule.

Solution to Problem

When a multi-core ferrule or a plurality of ferrules are polished, the heights of a plurality of optical fibers are desired to have values higher than a predetermined value and to be uniform after the polishing, and realization of a uniform polished state with little polishing is required. In addition, absence of scratches on the polished surface and inhibition of generation of a core dip in the optical fiber are also required.

These requirements are contradictory to each other in some cases. The present inventors conducted thorough studies in order to solve the above problems. As a result, the present inventors solved the problem regarding the height of the optical fiber by containing abrasive grains having a small particle diameter, and solved the problem of inhibition of the core dip by adopting silica as the abrasive grains. In addition, the present inventors found that increasing the amount of the abrasive grains and containing abrasive grains of a certain size allow a surface to be polished without causing scratches. Further, the present inventors found that adoption of an epoxy resin as a binder for holding the polishing material improves durability.

That is, a ferrule polishing material of the present invention solving the above problems includes a binder formed from a resin material, and abrasive grains dispersed in the binder. The resin material is all crosslinked. The abrasive grains: are contained in an amount of not less than 80% and not greater than 91% with respect to a sum of masses of the abrasive grains and the binder; include small-diameter particles being particles having a particle diameter of not greater than 100 nm, the small-diameter particles being present in an amount of not less than 62.5% and not greater than 80% with respect to the mass of the abrasive grains; and are formed from silica.

In particular, containing an epoxy resin in an amount of not less than 93% with respect to a mass of the resin material is preferable. Preferably, the epoxy resin is of a biphenyl type. Preferably, the binder has a pencil hardness of not less than 3H.

Preferably, the small-diameter particles are particles having a peak top particle diameter of not greater than 50 nm. Control in the range further facilitates realization of a uniform optical fiber height.

Further, preferably, the abrasive grains contain particles having a peak top particle diameter of not less than 150 nm, since a state where the polished surface state is without scratches is easily established.

Advantageous Effects of Invention

Since the ferrule polishing material of the present invention has the above configuration, polishing performance of a ferrule is high, and durability is also improved.

DESCRIPTION OF EMBODIMENTS

Hereinafter, a ferrule polishing material of the present invention is described in detail on the basis of an embodiment. The ferrule polishing material of the present embodiment is a member for polishing an end face of a ferrule. The ferrule is a member for performing a termination process for an optical fiber, and is a member forming an optical connector that connects optical fibers.

The ferrule polishing material of the present embodiment includes abrasive grains, a binder for dispersing the abrasive grains, and other necessary members. Preferably, the ferrule polishing material is used as a polishing layer in which the abrasive grains and the binder for dispersing the abrasive grains are formed in a layer state. In the case of the polishing layer, the thickness thereof is set to be preferably not greater than 5 μm and further preferably not greater than 3 μm. When the thickness is small, durability of the polishing layer is improved.

The abrasive grains are contained in an amount of not less than 80% and not greater than 91% with respect to the sum of the masses of the abrasive grains and the binder. In particular, as the lower limit value, 85%, 86%, 87%, or 87.5% may be adopted, and as the upper limit value, 90%, 89%, 88%, or 87.5% may be adopted. These upper limit values and lower limit values are combined as desired.

The abrasive grains are formed from silica. A material other than silica may be mixed. However, the amount of silica is, with respect to the mass of the entirety of the abrasive grains, preferably not less than 95%, more preferably not less than 97.5%, and further preferably not less than 99%. A material other than silica may be contained as particles other than the particles made of silica, or may be contained in the same particles made of silica.

As for the abrasive grains, a particle size distribution is specified. Specifically, small-diameter particles are present in an amount of not less than 62.5% and not greater than 80% with respect to the mass of the entirety of the abrasive grains. As the lower limit of the existence amount of the small-diameter particles, 65%, 70%, 72.5%, or 75% may be adopted. As the upper limit, 79%, 78%, 77%, 76%, or 75% may be adopted. These upper limit values and lower limit values are combined as desired. The small-diameter particles are particles having a particle diameter of not greater than a certain particle diameter. The particles having the certain particle diameter are particles having a particle diameter of not greater than 0.1 μm, further preferably not greater than 30 nm, and more preferably not greater than 20 nm. Preferably, the small-diameter particles have a peak top at a particle diameter of not greater than the above-described certain particle diameter. A peak top corresponds to the presence of a peak in a particle size distribution expressed in terms of volume, and a peak top particle diameter indicates the particle diameter at the peak. Preferably, the peak top particle diameter is a mode diameter in a range of particle diameters of not greater than a certain particle diameter. The peak top particle diameter of the small-diameter particles is preferably not greater than 50 nm, more preferably not greater than 30 nm, and further preferably not greater than 20 nm.

The form of the abrasive grains is not limited in particular, but spherical silica having a spherical shape or crushed silica having a crushed form may be adopted. In addition, particles having a particle diameter of not less than 100 nm are preferably contained. In particular, preferably, the particles have a peak top, and the peak top particle diameter is preferably not less than 150 nm and further preferably not less than 200 nm. Furthermore, in order to inhibit scratches on the polished surface, not containing particles having a particle diameter of not less than 5 μm is desirable. Containing crushed silica is preferable.

Herein, the "particle diameter" is a value measured by a combination of a laser diffraction/scattering type particle size distribution measuring device (LA-750: manufactured by HORIBA, Ltd.) and a dynamic light scattering type nanotrack particle size analyzer (UPA-EX150: manufactured by Nikkiso Co., Ltd.).

Specifically, using the laser diffraction/scattering type particle size distribution measuring device, a fluid obtained by dropping several drops of a slurry is subjected to flow cell measurement in a 700 mode, to measure a range where particle diameters are large. Using the dynamic light scattering type nanotrack particle size analyzer, batch measurement is performed in a state of dispersion in methyl ethyl ketone, to confirm particle diameters of particles having a particle diameter of not greater than 100 nm. The measurement results are combined with each other, whereby the particle size distribution is measured.

Spherical silica is produced by reacting metal silicon with oxygen. According to the production method in which metal silicon is reacted with oxygen, spherical silica having an average particle diameter of about 0.05 μm to 10 μm is easily obtained.

Crushed silica is fine particles producible by crushing silica. In terms of the feature of appearance, crushed silica has a rugged surface. In particular, silica in a form obtained by crushing the above-described spherical silica is desirably adopted. The crushing method is not limited in particular. Examples thereof include using a bead mill, a jet mill, a ball mill, and a vibratory ball mill.

Surface treatment may be performed on the abrasive grains. An example of the surface treatment is a method in which a silane compound is used. Examples of the silane compound include those having an epoxy group, a vinyl group, a phenylamino group, or the like, and a silane compound having an epoxy group is preferable. The treatment amount by the silane compound is not limited in particular, and examples thereof include not less than 1%, not less than 2%, not less than 3%, not less than 4%, not less than 5%, and the like with respect to the mass of the entirety of the abrasive grains.

For the binder, a resin material is adopted. The above-described abrasive grains are dispersed in this binder, to form a polishing layer. The resin material is all crosslinked. Here, "all crosslinked" means that a crosslinkable precursor in the resin material is contained in an amount of not less than 98% (preferably, not less than 99%, further preferably substantially 100%) with respect to the mass of the entirety of the resin material. An example of the crosslinkable precursor is an epoxy resin. A component derived from the epoxy resin means, when an epoxy resin precursor and another precursor are copolymerized, only a portion derived from the epoxy resin precursor in one molecular chain.

The epoxy resin is not limited in particular. A bisphenol type (A type, F type, mixture of A type and F type, etc.), a biphenyl type, or the like may be adopted, and the biphenyl type is preferable. The biphenyl-type epoxy resin is a resin obtained by reacting an epoxy resin precursor having a biphenyl skeleton.

The biphenyl-type epoxy resin exhibits high heat resistance due to the rigidity of the biphenyl structure. The biphenyl structure has high linearity, and when the biphenyl-type epoxy resin is made into a cured product, high plastic deformation ability is exhibited. For the biphenyl skeleton of the biphenyl-type epoxy resin, a halogen-substituted product, an alkyl-substituted product, a hydrogenated product, or the like may be used. In particular, from the viewpoint of handling, a methyl-substituted product is preferably used.

Examples of a commercial product of the bisphenol-type epoxy resin precursor include ZX-1059 (NIPPON STEEL Chemical & Material Co., Ltd.) and the like. Examples of a commercial product of the epoxy resin precursor having the biphenyl skeleton include "jER (registered trademark)" YX4000H, YX4000, YL6616, YL6121H, YL6640, YL6677 (these are manufactured by Japan Epoxy Resins Co., Ltd.), NC3000 (manufactured by Nippon Kayaku Co., Ltd.), and the like.

As the epoxy resin, a cured product composed only of the biphenyl-type epoxy resin precursor may be used, and the bisphenol-type epoxy resin precursor (e.g., bisphenol A) may be used in combination. An example of the biphenyl-type epoxy resin precursor is a compound represented by the general formula below. The four Rs in the general formula are each independently selected from an alkyl group such as methyl, hydrogen, and a halogen such as chlorine, and in particular, preferably, are all a methyl group.

[Chem. 1]

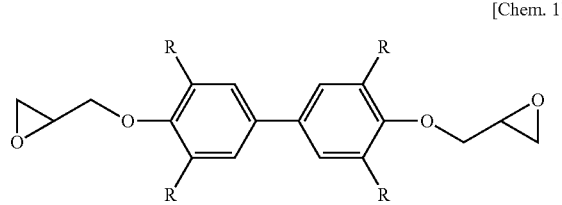

The curing agent for the epoxy resin is not limited in particular, and a curing agent of a phenol type is preferably adopted. A curing catalyst may be added. Examples of commercial products of the curing agent include TD2131 (DIC CORPORATION), MEH 4500 (MEIWA PLASTIC INDUSTRIES, LTD.), and the like.

As for the cured epoxy resin, the binder preferably has a pencil hardness of not less than 3H. When the curing time of the epoxy resin is made long, the pencil hardness is increased. Examples of the lower limit value of the curing time include 5 minutes, 8 minutes, 10 minutes, 11 minutes, 13 minutes, 14 minutes, 16 minutes, and 20 minutes.

An example of another necessary member is a support base member. When a film-shaped member is adopted as the support base member, and a polishing layer composed of the abrasive grains and the binder is formed on the surface of the support base member, a film-shaped ferrule polishing material is provided. Moreover, a support base member in an appropriate form other than the film shape may be adopted, and when a polishing layer composed of the abrasive grains and the binder is formed on the surface of the support base member, a ferrule polishing material having an intended form is obtained. Further, a ferrule polishing material may also be formed without the support base member, i.e., only as a combination of the abrasive grains and the binder.

The material forming the support base member only needs to have necessary elasticity and necessary strength to hold the polishing layer. For example, a film or the like formed from polyester such as polyethylene terephthalate (PET) or polybutylene terephthalate, polycarbonate, or the like is suitable. When a film having a thin-film shape is adopted as the support base member, the thickness thereof is not limited in particular, and examples thereof include about 25 to 150 µm.

In accordance with the purpose such as improvement of adhesiveness between the support base member and the polishing layer, patterning on the surface of the polishing layer, or the like, a buffer layer may be formed on the surface of the support base member in advance. For example, an easy adhesion layer to serve as the buffer layer may be formed on the support base member surface. For example, the easy adhesion layer is formed by applying and drying a buffer coating formed from an epoxy resin, an acrylic resin, a polyester resin, or the like on the support base member surface. The support base member surface may be subjected to heat treatment, corona treatment, plasma treatment, or the like, to form the buffer layer, and, in particular, performing corona treatment is preferable.

Method for Producing Ferrule Polishing Material

The ferrule polishing material of the present embodiment is produced by appropriately dispersing the abrasive grains in the binder. As for dispersion of the abrasive grains, the abrasive grains may be kneaded together with the resin material forming the binder, or may be mixed/dispersed in a precursor such as a monomer/prepolymer not having yet become the resin material, and then, the precursor is reacted to be the resin material. In particular, desirably, the abrasive grains are dispersed into an organic solvent in advance to form a slurry, and then the slurry is mixed/dispersed into the binder. In this case, as the organic solvent adopted as a dispersion medium, an organic solvent capable of being mixed with a solvent that dissolves the resin (or the precursor thereof) forming the binder or the precursor itself is desirably adopted.

The resin material forming the binder is an epoxy resin, and, in general, in order to cure the epoxy resin, the epoxy resin is heated at a certain temperature for a certain time to be cured. As a curing condition, performing curing for a long time as much as possible is preferable. Examples of the lower limit value of the curing time include 5 minutes, 8 minutes, 11 minutes, and 14 minutes, and in particular, setting the lower limit value to 14 minutes is preferable.

The lower limit value of the curing temperature is preferably set to be 110° C., more preferably set to be 120° C., and further preferably set to be 130° C. The upper limit value of the curing temperature is preferably set to be 180° C., more preferably set to be 170° C., and further preferably set to be 160° C. These upper limit values and lower limit values are combined as desired.

When a mixture of the precursor and the abrasive grains is applied on the surface of the above-described support base member and then the precursor is reacted, a polishing layer is formed on the surface of the support base member.

The method for obtaining silica particles forming the abrasive grains is not particularly limited. However, a general method such as a method of reacting metal silicon with oxygen, a method of melting silica by heat, or a sol-gel method may be adopted. In particular, a combination of the method of reacting metal silicon with oxygen and the sol-gel method is desirable.

EXAMPLES (Preparation of Sample)·Test Example 1

As the abrasive grains, silica particles serving as small-diameter particles and having a peak top (mode diameter) of 20 nm, and silica particles having a volume average particle diameter of 200 nm and substantially not containing coarse grains of not less than 3 µm were mixed such that the content of the small-diameter particles was 70% with respect to the mass of the abrasive grains. As the binder, a biphenyl-type epoxy resin (the Rs in the above chemical formula are all a methyl group) serving as the precursor of the resin material, a trisphenolmethane derivative (manufactured by MEIWA PLASTIC INDUSTRIES, LTD., MEH7500) serving as the curing agent, and triphenylphosphine serving as the curing catalyst were mixed at a mass ratio of 100:95:2 to be used.

The abrasive grains and the binder were mixed at a mass ratio of 93.5:6.5 to be a slurry. The obtained slurry was applied to have a thickness of 3 µm on the surface of a PET resin plate serving as the support base member and having a thickness of 75 µm, then, the resultant matter was cured at 140° C. for 5 minutes to form a polishing layer, and the polishing layer was used as a polishing material of Test Example 1. The surface of the support base member was subjected to corona treatment in advance.

Test Examples 2 and 3

Polishing materials were produced by the same method as that for Test Example 1 except that the thickness of the polishing layer was set to 5 μm (Test Example 2) and 8 μm (Test Example 3), and the polishing materials were used as the polishing materials of the respective Test Examples.

Test Examples 4 to 6

Polishing materials were produced by the same method as that for Test Example 1 except that the curing time was set to 8 minutes (Test Example 4), 11 minutes (Test Example 5), and 14 minutes (Test Example 6), and the polishing materials were used as the polishing materials of the respective Test Examples.

Test Examples 7 to 9

Polishing materials of the present Test Examples were produced in the same manner as that for Test Example 1 except that, with respect to 100 parts by mass of the abrasive grains, surface treatment was performed by 5 parts by mass of a silane compound {epoxy silane (Test Example 7), vinylsilane (Test Example 8), and phenylaminosilane (Test Example 9)}.
(Test 1)

Using the polishing material of Test Example 1 and a commercially-available polishing material (ADS-127 manufactured by NTT-AT), regarding an LC/PC connector (zirconia ferrule, glass fiber), 50 terminals were fixed to a jig, and polishing was performed by using Bulls-3000 as a polishing machine. As pads to which the polishing materials were fixed, pads all having a hardness of 80 were used. Polishing was performed in five stages under the following conditions: (a) diamond polishing material (9 μm), rotational speed of 130 rpm, 15 seconds; (b) diamond polishing material (30 μm), rotational speed of 130 rpm, 10 seconds; (c) diamond polishing material (9 μm), rotational speed of 130 rpm, 15 seconds; (d) diamond polishing material (1 μm), rotational speed of 130 rpm, 25 seconds; and (e) polishing material of each Test Example, rotational speed of 130 rpm, 25 seconds.

Considering the (a) to (e) as one set, and regarding the LC/PC connector for which polishing was performed once, 10 times, 20 times, 30 times, and 40 times, the end face of each fiber was observed with a microscope, and the presence or absence of scratches was determined. The scratch was expressed in terms of the percentage of the number of terminals in which scratches were observed out of all the 50 terminals.

Return loss of the fiber was measured by an optical connector characteristic measuring device OLCR-type reflectometer.

The presence or absence of a portion in which the polished polishing layer was peeled off from the support base member was observed, and the area of the peeled portion was measured. Then, the proportion of the peeled portion relative to the area of the entirety of the polishing layer was evaluated in six levels of 0 to 5, i.e., 0 (a state where no peeling was present at all), 1 (the proportion of peeled portion was 1 to 20%), 2 (said proportion was 21 to 40%), 3 (said proportion was 41 to 60%), 4 (said proportion was 61 to 80%), and 5 (said proportion was 81 to 100% (=a state where no coating film remained)).

Three-dimensional shape measurement was performed regarding the end face shape of the LC/PC connector, and the height of the end face of the glass fiber with respect to the end face of the zirconia ferrule was measured. The height of the end face was indicated while the direction in which the end face of the glass fiber was recessed with respect to the end face of the zirconia ferrule was regarded as the negative direction.

The results of the above are shown in Table 1 (polishing material of Test Example 1) and Table 2 (commercial product).

Here, occurrence of scratches are preferably not greater than 50%. The return loss is preferably not less than 57 dB. Absence of peeling of the polishing layer of the polishing material is preferable. The fiber height is preferably in a range of ±20 nm.

TABLE 1

| Test | Number of times | | | | |
|---|---|---|---|---|---|
| Example 1 | 1 | 10 | 20 | 30 | 40 |
| Scratch (%) | 38 | 23 | 8 | 31 | 92 |
| Return loss (dB) | Not less than 60 | Not less than 60 | Not less than 60 | Not less than 60 | Not less than 60 |
| Peeling | 0 | 0 | 1 | 2 | 2 |
| Fiber height (nm) | −6 | −18 | −7 | −3 | −7 |

TABLE 2

| Commercial | Number of times | | | | |
|---|---|---|---|---|---|
| product | 1 | 10 | 20 | 30 | 40 |
| Scratch (%) | 15 | 54 | 46 | 38 | 92 |
| Return loss (dB) | 53 | 51 | 52 | 51 | 51 |
| Peeling | 0 | 1 | 2 | 2 | 4 |
| Fiber height (nm) | −39 | −42 | −37 | −41 | −41 |

As is clear from the tables, in the case of the polishing material of Test Example 1, occurrence of scratches was not greater than 50% until 40 times was reached, whereas, in the case of the commercial product, occurrence of scratches was 54% being a value exceeding 50% already at 10 times, and in addition, exhibited high values as a whole except for the initial time.

The return loss was 60 dB in the case of the polishing material of Test Example 1 and was 53 dB in the case of the commercial product.

Peeling of the polishing layer occurred more in the case of the commercial product than in the case of the polishing material of Test Example 1. For example, in the case of the polishing material of Test Example 1, even after not less than 20 times, peeling of the polishing layer to an extent that might cause trouble in use did not occur.

The fiber heights in the case of the polishing material of Test Example 1 were found to be all in a preferable range, whereas the fiber heights in the case of the commercial product were found to be lower.
(Test 2)

Regarding the polishing materials of Test Examples 2 and 3, polishing was performed on the LC/PC connector in a manner similar to that in Test 1. As a result, with respect to the occurrence of scratches, the return loss, and the fiber height, significant difference from the polishing material of Test Example 1 was not observed. However, in accordance with increase in the thickness of the polishing layer, a tendency that peeling of the polishing layer relevant to durability increased was observed (Table 3).

TABLE 3

| Peeling | Number of times | | | | |
|---|---|---|---|---|---|
| | 1 | 10 | 20 | 30 | 40 |
| Test Example 1 | 0 | 0 | 1 | 2 | 2 |
| Test Example 2 | 0 | 1 | 2 | 2 | 3 |
| Test Example 3 | 0 | 3 | 4 | 4 | 5 |

(Test 3)

Regarding the polishing materials of Test Examples 4 to 6, polishing was performed on the LC/PC connector in a manner similar to that in Test 1. As a result, with respect to the occurrence of scratches, the return loss, and the fiber height, significant difference from the polishing material of Test Example 1 was not observed. However, in accordance with increase in the curing time of the binder forming the polishing layer, a tendency that peeling of the polishing layer decreased was observed (Table 4). Regarding Test Examples 1 and 4 to 6, when the pencil hardness was measured, the pencil hardness was 2H in Test Example 1, 2 H in Test Example 4, 2 H in Test Example 5, and 3H in Test Example 6.

TABLE 4

| Peeling | Number of times | | | | |
|---|---|---|---|---|---|
| | 1 | 10 | 20 | 30 | 40 |
| Test Example 1 | 0 | 0 | 1 | 2 | 2 |
| Test Example 4 | 0 | 0 | 1 | 1 | 2 |
| Test Example 5 | 0 | 0 | 0 | 1 | 1 |
| Test Example 6 | 0 | 0 | 0 | 0 | 1 |

(Test 4)

Regarding the respective polishing materials of Test Examples 1 and 7 to 9, the same test as Test 1 was performed. Then, peeling of the polishing material of each Test Example was observed, and the polishing materials of Test Examples 7 to 9 were found to be excellent in durability with less peeling than the polishing material of Test Example 1.

The invention claimed is:

1. A ferrule polishing material comprising:
   a binder comprising a resin material; and
   abrasive grains dispersed in the binder, wherein
   the resin material is all crosslinked, and comprises a biphenyl epoxy resin which is a resin obtained by reacting an epoxy resin precursor having a biphenyl skeleton, and
   the abrasive grains
      are contained in an amount of not less than 80% and not greater than 91% with respect to a sum of masses of the abrasive grains and the binder,
      include small-diameter particles being particles having a particle diameter of not greater than 100 nm, the small-diameter particles being present in an amount of not less than 62.5% and not greater than 80% with respect to the mass of the abrasive grains, and
      comprise silica.

2. The ferrule polishing material according to claim 1, wherein
   the resin material comprises an epoxy resin in an amount of not less than 93% with respect to a mass of the resin material.

3. The ferrule polishing material according to claim 1, wherein
   the binder has a pencil hardness of not less than 3H.

4. The ferrule polishing material according to claim 1, wherein
   the small-diameter particles are particles having a peak top particle diameter of not greater than 50 nm.

5. The ferrule polishing material according to claim 1, wherein
   the abrasive grains comprise particles having a peak top particle diameter of not less than 150 nm.

6. The ferrule polishing material according to claim 1, wherein
   the resin material comprises an epoxy resin in an amount of not less than 93% with respect to a mass of the resin material,
   the binder has a pencil hardness of not less than 3H,
   the small-diameter particles are particles having a peak top particle diameter of not greater than 50 nm, and,
   the abrasive grains comprise particles having a peak top particle diameter of not less than 150 nm.

7. The ferrule polishing material according to claim 1, wherein
   the abrasive grains are contained in the amount of not less than 85% and not greater than 90% with respect to the sum of masses of the abrasive grains and the binder.

8. The ferrule polishing material according to claim 1, wherein
   the abrasive grains are contained in the amount of not less than 86% and not greater than 89% with respect to the sum of masses of the abrasive grains and the binder.

9. The ferrule polishing material according to claim 1, wherein the small-diameter particles are present in the amount of not less than 65% and not greater than 79% with respect to the mass of the abrasive grains.

10. The ferrule polishing material according to claim 1, wherein the small-diameter particles are present in the amount of not less than 70% and not greater than 78% with respect to the mass of the abrasive grains.

* * * * *